(12) United States Patent
Breier et al.

(10) Patent No.: US 6,837,348 B2
(45) Date of Patent: Jan. 4, 2005

(54) HYDRODYNAMIC CLUTCH DEVICE

(75) Inventors: Horst Breier, Dittelbrunn (DE); Georg Mencher, Bergrheinfeld (DE); Thomas Bauer, Grossbardorf (DE); Ralf Rönnebeck, Schonungen (DE); Jürgen Dacho, Bad Kissingen (DE); Peter Frey, Gerolzhofen (DE); Bernd Schöder, Münnerstadt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/379,929

(22) Filed: Mar. 5, 2003

(65) Prior Publication Data

US 2003/0178275 A1 Sep. 25, 2003

(30) Foreign Application Priority Data

Mar. 20, 2002 (DE) .......................... 102 12 281

(51) Int. Cl.[7] ............................................. F16H 45/02
(52) U.S. Cl. ................... 192/3.29; 192/110 B; 192/212
(58) Field of Search .............................. 192/3.28, 3.29, 192/3.3, 212, 110 B

(56) References Cited

U.S. PATENT DOCUMENTS

| | | | | | |
|---|---|---|---|---|---|
| 4,926,988 A | * | 5/1990 | Kundermann | ............... | 192/3.3 |
| 5,655,635 A | * | 8/1997 | Yuergens et al. | .......... | 192/3.29 |
| 6,354,413 B2 | * | 3/2002 | Heller et al. | ................ | 192/3.29 |
| 6,390,263 B1 | * | 5/2002 | Arhab | ........................ | 192/3.29 |
| 6,715,595 B2 | * | 4/2004 | Schmid | ..................... | 192/3.28 |

FOREIGN PATENT DOCUMENTS

DE     195 14 411     11/1995     ........... F16D/33/00

* cited by examiner

*Primary Examiner*—Saul Rodriguez
(74) *Attorney, Agent, or Firm*—Cohen, Pontani, Lieberman & Pavane

(57) ABSTRACT

A hydrodynamic clutch device for a hydrodynamic torque converter includes a turbine wheel for rotation about an axis of rotation. The turbine wheel is connected by a lockup clutch arrangement for transmitting torque to a housing arrangement. The turbine wheel includes a turbine wheel shell for housing turbine wheel blades. The turbine wheel shell is operably connected by a torsional vibration damper arrangement for transmitting torque. The torsional vibration damper arrangement includes a first transmission element coupled with the lockup clutch arrangement and the turbine wheel shell and includes a second transmission element coupled with the first transmission element for transmitting torque by means of a damper element arrangement; and wherein the first transmission element is supported at the housing arrangement in a first direction by a bearing arrangement.

9 Claims, 5 Drawing Sheets

HYDRODYNAMIC CLUTCH DEVICE

PRIORITY CLAIM

This application claims priority to application DE 102 12 281.4 filed Mar. 20, 2002 in Germany.

FIELD OF THE INVENTION

The present invention is directed to a hydrodynamic clutch device. In particular, the present invention is directed to a hydrodynamic torque converter that includes a turbine wheel arranged in a housing arrangement for rotation about an axis of rotation.

BACKGROUND OF THE INVENTION

DE 195 14 411 A1 discloses a hydrodynamic clutch device which is constructed as a hydrodynamic torque converter and in which the turbine wheel shell is constructed so as to be separate from the turbine wheel hub and is coupled with this turbine wheel hub for transmitting torque by means of a turbine damper, as it is called. An input area of the turbine damper, i.e. the torsional vibration damper arrangement, is fixedly connected to the turbine wheel shell. An output area of the torsional vibration damper arrangement is fixedly connected to the turbine wheel hub. In the radial inner area, the turbine wheel shell is supported in radial direction with respect to the turbine wheel hub, so that the radial bearing support of the input area of the torsional vibration damper arrangement with respect to the output area connected to the turbine wheel hub is also provided at the same time.

SUMMARY OF THE INVENTION

It is an object of the present invention to further develop a hydrodynamic clutch device of the type described above in such a way that highly reliable operation can be provided in a structurally simple design, particularly in the area of the torsional vibration damper arrangement.

This and other objects are met by a hydrodynamic clutch device for a hydrodynamic torque converter. The device includes a turbine wheel for rotation about an axis of rotation. The turbine wheel is connected by a lockup clutch arrangement for transmitting torque to a housing arrangement. The turbine wheel includes a turbine wheel shell for housing turbine wheel blades. The turbine wheel shell is operably connected by a torsional vibration damper arrangement for transmitting torque. The torsional vibration damper arrangement includes a first transmission element coupled with the lockup clutch arrangement and the turbine wheel shell and includes a second transmission element coupled with the first transmission element for transmitting torque by means of a damper element arrangement; and wherein the first transmission element is supported at the housing arrangement in a first direction by a bearing arrangement. The first transmission element is supported at the housing arrangement in an axial direction or in a radial direction by a bearing arrangement.

Further, a first transmission element is supported at the housing arrangement in axial direction and/or in radial direction by a bearing arrangement.

Therein, the support of the input side of the torsional vibration damper arrangement, with which the turbine wheel shell is also fixedly coupled, is carried out directly by a structural component part of this input side, namely, a first transmission element, so that no special steps need to be provided, e.g., in the area of the turbine shell, for the axial and radial support. The turbine wheel shell can accordingly be optimized, also above all with respect to its shape, with respect to the fluid circulation for generating the hydrodynamic torque coupling, while a structural component part that is less relevant with regard to fluid flow, namely, the one first transmission element, is constructed in such a way that it can carry out the required supporting function.

In this connection, it can be provided, for example, that the bearing arrangement comprises a sliding bearing or corrugated body bearing. The at least one first transmission element can have a sleeve-like radial bearing portion which engages in the bearing arrangement and which is adjoined by a disk-like axial bearing portion.

An essential feature and advantage of the present invention consists in that the turbine wheel shell can be supported axially and radially by a first transmission element. This axial and radial support can be carried out with respect to the housing arrangement and/or also with respect to the turbine wheel hub. Further, it is also possible, of course, that the one first transmission element is supported axially at a second transmission element. In order to keep the friction losses as low as possible in this connection, it is suggested that a supporting bulge area is provided at one of the transmission elements, this supporting bulge area being supported at the other transmission element.

According to another feature of the present invention, the above-stated object is met in that a supporting element is provided at the turbine wheel hub, at which supporting element the turbine wheel shell is supported at least in radial direction by its radial inner area and at which a first transmission element is supported at least in axial direction. It can be provided, for example, that at least one bearing element which serves to support the turbine wheel shell and/or the first transmission element is provided at the supporting element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
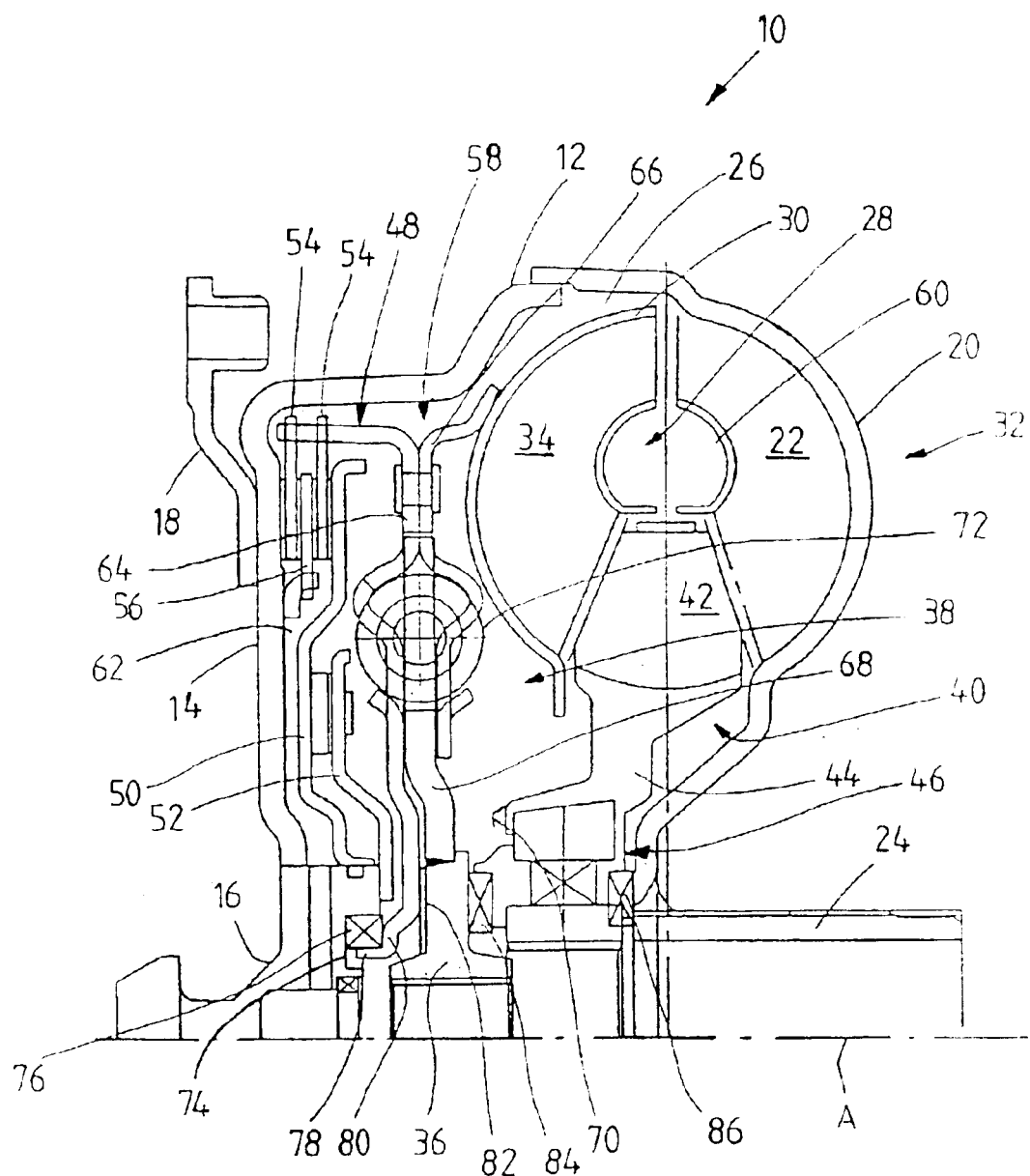
FIG. 1 shows a view in a partial longitudinal section through a hydrodynamic torque converter according to a first embodiment form according to the invention.

FIG. 1 shows a view in a partial longitudinal section through a hydrodynamic torque converter 10. This hydrodynamic torque converter 10 comprises a housing arrangement 12. The housing arrangement 12 in turn comprises a housing cover 14 which is fixedly connected to a cover hub 16 in its radial inner area. The cover hub 16 is constructed for support in a corresponding receiving recess of a drive shaft. On the radial outer side, the housing cover 14 carries a connection arrangement 18 which can be connected to a flex plate or the like provided at a drive shaft for coupling the housing arrangement 12 to the drive shaft so as to be fixed with respect to relative rotation. Further, the housing cover 14 is fixedly connected to an impeller wheel shell 20 in its radial outer housing area. At its inner side, this impeller wheel shell 20 carries a plurality of impeller wheel blades 22 which are arranged successively in circumferential direction around an axis of rotation A and, in its radial inner area, is fixedly connected to a sleeve-like impeller wheel hub 24, for example, by welding.

A turbine wheel 28 is provided in the interior 26 of the housing arrangement 12. The turbine wheel 28 comprises a turbine wheel shell 30 which carries a plurality of turbine wheel blades 34 at its side facing the impeller wheel 32 which essentially comprises the impeller wheel shell 20, impeller wheel blades 22 and impeller wheel hub 24. A turbine wheel hub 36 is constructed for coupling with a driven shaft, not shown, e.g., a transmission input shaft, so as to be fixed with respect to relative rotation and is coupled with the turbine wheel shell 30 by a torsional vibration damper arrangement 38, described in more detail in the following, so as to be fixed with respect to rotation relative to it.

A stator wheel 40 is located axially between the turbine wheel 28 and the impeller wheel 32. This stator wheel 40 comprises a plurality of stator wheel blades 42 which are supported on a stator wheel ring 44. This stator wheel ring 44 is supported in turn by a freewheel arrangement 46 on a supporting element, not shown, for example, a supporting hollow shaft, in such a way that it is rotatable in one rotational direction around the axis of rotation but is prevented from rotating in the other direction.

The turbine wheel 28 can be connected to the housing arrangement 12 so as to be fixed with respect to relative rotation by means of a lockup clutch, designated generally by 48. In the present example, the lockup clutch 48 comprises a clutch piston 50 which is connected to the housing arrangement 12, i.e., the housing hub 16 thereof, by means of a driving element 52 so as to be fixed with respect to rotation relative to it but so as to be axially movable. A plurality of plates 54 and 56, respectively, are located in the radial outer area between the clutch piston 15 and the housing cover 12. Plates 54 are coupled with an input side 58 of the torsional vibration damper arrangement 38 so as to be fixed with respect to rotation relative to it, while plate 56 is coupled to the housing cover 14 so as to be fixed with respect to rotation relative to it. By increasing the fluid pressure in space 60, which essentially contains the turbine wheel 28, in relation to the space 62 formed essentially between the clutch piston 50 and the housing cover 14, the clutch piston 50 is pressed against the plates 54, 56 so that a frictional connection is generated between the housing arrangement 12 and the input side 58 of the torsional vibration damper arrangement 38.

The torsional vibration damper arrangement 38 or the input side 58 comprises two cover disk elements 64, 66. These cover disk elements 64, 66 are fixedly connected, e.g., riveted, to one another in their radial outer area. The cover disk element 64 which lies closer to the housing cover 14 is bent axially in its radial outer area and engages with the plates 54 in this axially bent area so as to be fixed with respect to rotation relative to them. The cover disk element 66 which lies closer to the impeller wheel shell 30 is likewise bent axially in its radial outer area and is fixedly connected, e.g., by welding, in this area to the turbine wheel shell 30. Radially inside their connection to one another, the two cover disk elements 64, 66 are guided apart axially in order to receive therebetween a central disk element 68 of an output side 70 of the torsional vibration damper arrangement 38. In a manner which is known per se, the two cover disk elements 64, 66 and the central disk element 68 form respective spring windows with circumferential supporting areas for damper springs 72.

The cover disk elements 64, 66 are movable in circumferential direction with respect to the central disk element 68 against the pretensioning action of the damper springs 72. In its radial inner area, the central disk element 68 is fixedly connected to the turbine wheel hub 36, for example, by welding.

As seen in FIG. 1, the cover disk element 64 which is positioned closer to the housing cover 14 is constructed so as to be longer toward the radial inner side than the other cover disk element 66. In particular, it projects into the area of the turbine wheel hub 36 and the housing hub 16.

A circumferential recess 74 is formed at the housing hub 16, a bearing 76 being inserted into the circumferential recess 74 in such a way that it is supported in axial direction, namely, in the direction of the housing hub 16, as well as toward the radial outer side. The bearing 76 can be a rolling body bearing or a sliding bearing. In the radial inner end area, the cover disk element 64 has a sleeve-like portion 78 which extends substantially axially and engages in the bearing 76 and is accordingly supported in radial direction at the bearing 76. An approximately radially extending portion 80 which is supported axially at the bearing 76 adjoins this sleeve-like portion 78. In this way, the entire input side 58 of the torsional vibration damper arrangement 38 is supported by means of the bearing 76 with respect to the housing arrangement 12 in axial direction, namely, toward the housing cover 14 or housing hub 16, as well as in radial direction. Accordingly, this turbine wheel shell 30 is supported in axial direction as well as in radial direction with respect to the housing arrangement 12 by the cover disk element 66 which is fixedly connected to the cover disk element 64 and which carries the turbine wheel shell 30 in a fixed manner.

In the other axial direction, i.e. in the direction of the impeller wheel 32, the cover disk element 64 which is lengthened toward the radial inner side is supported at the turbine wheel hub 36. In this area of the support, a plurality of approximately radially extending groove-like channels 82 can be provided and the fluid circulating in the interior 26 can flow through these channels 82 to ensure a good lubrication in the area of this support. The turbine wheel hub 36 is supported axially at its other axial side by a bearing 84 at the stator wheel 40 and at the freewheel arrangement 46. This latter is supported axially at the impeller wheel 32 by a bearing 86.

By means of the arrangement shown in FIG. 1, a reliable bearing support, particularly of the input side 58 of the torsional vibration damper arrangement 38, is ensured in radial direction and in axial direction. At the same time, this bearing support also ensures the correct bearing support for the turbine wheel shell 30 and the turbine wheel blades 34 supported on the latter. Otherwise, no other precautions for the bearing support need to be carried out at the turbine wheel shell 30.

Figure 2:
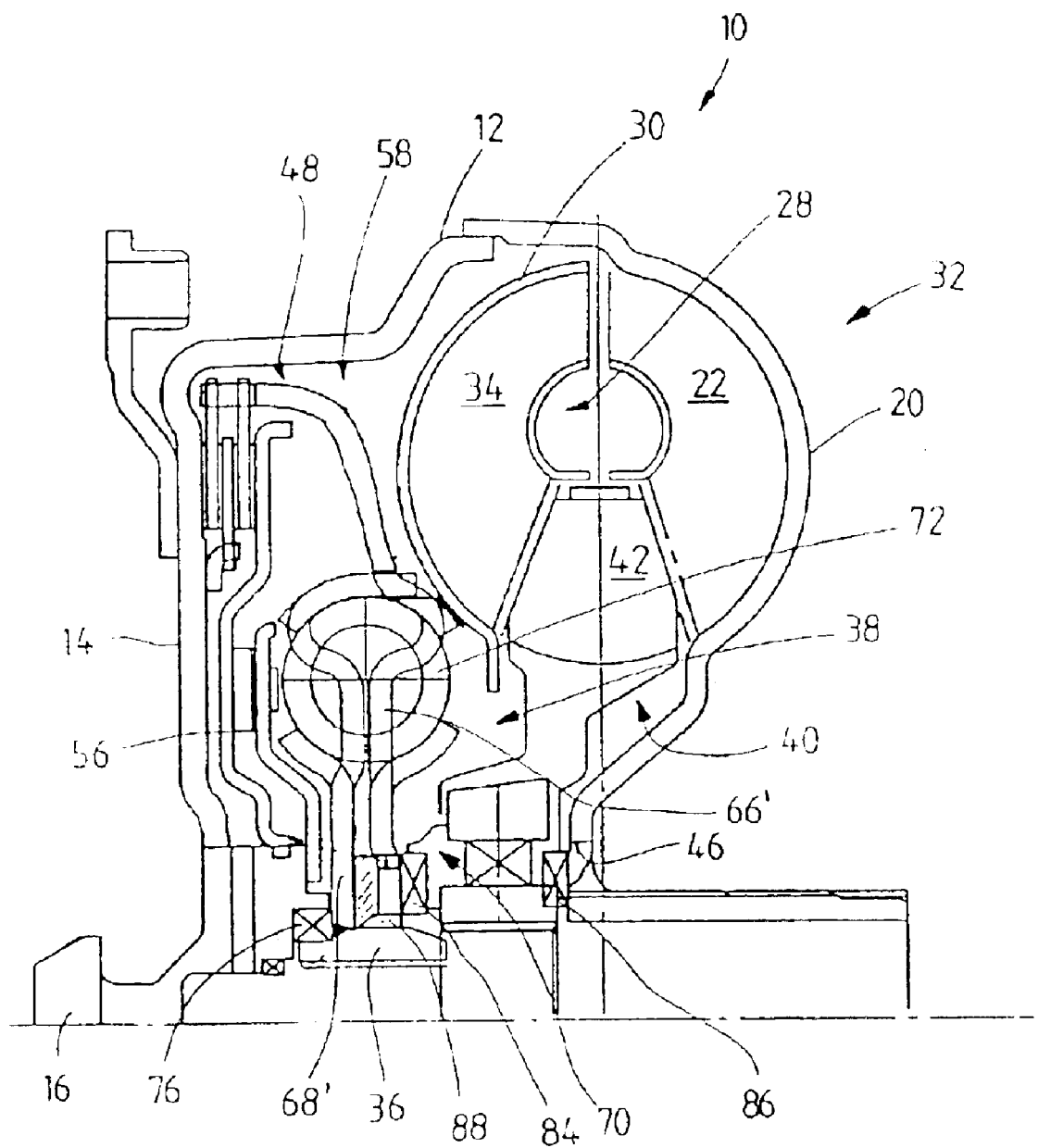
FIG. 2 shows a view in a partial longitudinal section through a hydrodynamic torque converter according to a second embodiment form according to the invention.

FIG. 2 shows another embodiment form of a hydrodynamic torque converter 10. In its basic construction, this essentially corresponds to the hydrodynamic torque converter 10 shown in FIG. 1, so that the same components are designated by the same reference numbers and reference is had to the preceding extensive comments regarding the basic construction.

It will be seen in the hydrodynamic torque converter 10 shown in FIG. 2 that the torsional vibration damper arrangement 38 now has only one individual disk-like structural component part 66' or 68', respectively, at the input side 58 and at the output side 70 of the same. The disk-like structural component part or transmission element 66' is coupled with the lockup clutch arrangement 48 in its radial outer area and carries the turbine wheel shell 30, e.g., by welding, in its radial middle area, that is, approximately in the area in which the damper springs 72 are located. The other disk-like structural component part or transmission element 68' is fixedly connected, e.g., by welding, in its radial inner area to the turbine wheel hub 36. The two transmission elements 66' and 68' are located axially opposite one another and form the spring window with support portions for the damper springs 72. In its radial outer area, the transmission element 68' can engage in corresponding recesses of the transmission element 66' associated with the input side 58 by means of finger-like projections, so that there is a limiting of the rotational angle.

The turbine wheel hub 36 is supported by the bearing 76 axially and radially with respect to the housing hub 16 only by the transmission element 68' supported at it. A sliding bearing element 88 is located at the other axial side of the transmission element 68' and is supported at the transmission element 68' by an axially directed surface and is supported at an outer circumferential surface of the turbine wheel hub 36 by a surface that is directed radially inward. The radial inner area of the transmission element 66' is likewise supported at this bearing element 88, preferably in radial and axial direction. In order to ensure defined friction locations, the radial inner end area of the transmission element 66' can be coupled with the bearing element 88' so as to be fixed with respect to rotation relative to it, so that it is ensured that the bearing element 88' always acts in a siding-frictional manner with respect to the transmission element 68' and the turbine wheel hub 36. The transmission element 66' is then supported in axial direction at its other, axial side by the bearing 84 at the stator wheel 40 or at the freewheel arrangement 46.

As in the embodiment form according to FIG. 1, the turbine wheel shell 30 in this case is supported in axial direction as well as in radial direction by one of the transmission elements 66'. No special steps were taken at the turbine wheel shell 30 for additional radial or axial support.

Figure 3:
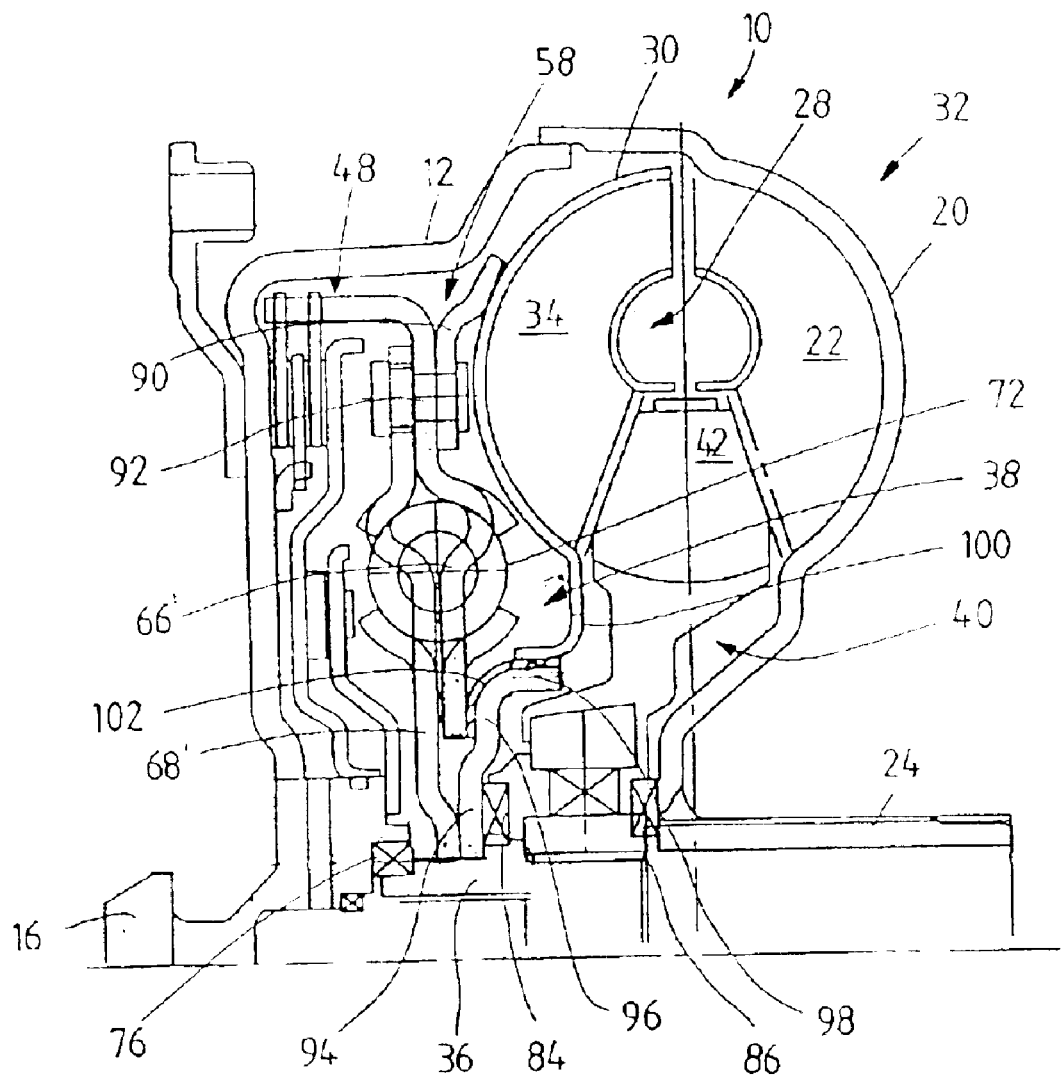
FIG. 3 shows a view in a partial longitudinal section through a hydrodynamic torque converter according to a third embodiment form according to the invention.

The hydrodynamic torque converter 10 shown in FIG. 3 also substantially corresponds to the embodiment form shown in FIG. 1 with respect to its basic construction. Therefore, reference is again had to the preceding remarks in this connection.

The torsional vibration damper arrangement 38 again has the two transmission elements 66', 68' located axially across from one another. The transmission element 66' is to be allocated to the input side 58 and connected to the lockup clutch arrangement 48 radially outside in an axially bent area. Further, a connection element 90 is fixedly connected in this radial outer area to the transmission element 66' by rivet bolts 92. The turbine wheel shell 30 is connected by welding to this connection element 90 in its radial outer area. The rivet bolts 92 simultaneously also form a guide for the transmission element 68' with respect to the transmission element 66', wherein the function of rotational angle limiting can also be provided in this area of the guide at the same time. The transmission element 68' is connected in its radial inner area to the turbine wheel hub 36, for example, by welding. Further, a supporting element 94 is fixedly connected to the turbine wheel hub 36, for example, by welding. The supporting element 94 initially extends toward the radial outside and is then bent in axial direction in a bending area. The radial inner end area of the transmission element 66' is located between a radial inner, substantially radially extending portion 96 of this supporting element 94 and the radial inner area of the transmission element 68'. A radial inner end area 100 of the turbine wheel shell 30 is supported in radial direction in a correspondingly bent sleeve-like portion at a substantially cylindrical portion 98 which extends approximately axially. A sleeve-like sliding bearing element 102 is arranged at the side supporting the transmission element 66' and turbine wheel shell 30.

The axial bearing support of the different components is carried out in turn by the bearing 76 which acts between the housing hub 16 and the turbine wheel hub 36. By means of the bearing 84, the turbine wheel hub 36 is supported axially at the stator wheel 40 by the supporting element 94 fixed to it, the stator wheel 40 being supported axially at the impeller wheel 32 by the bearing 86.

Figure 4:
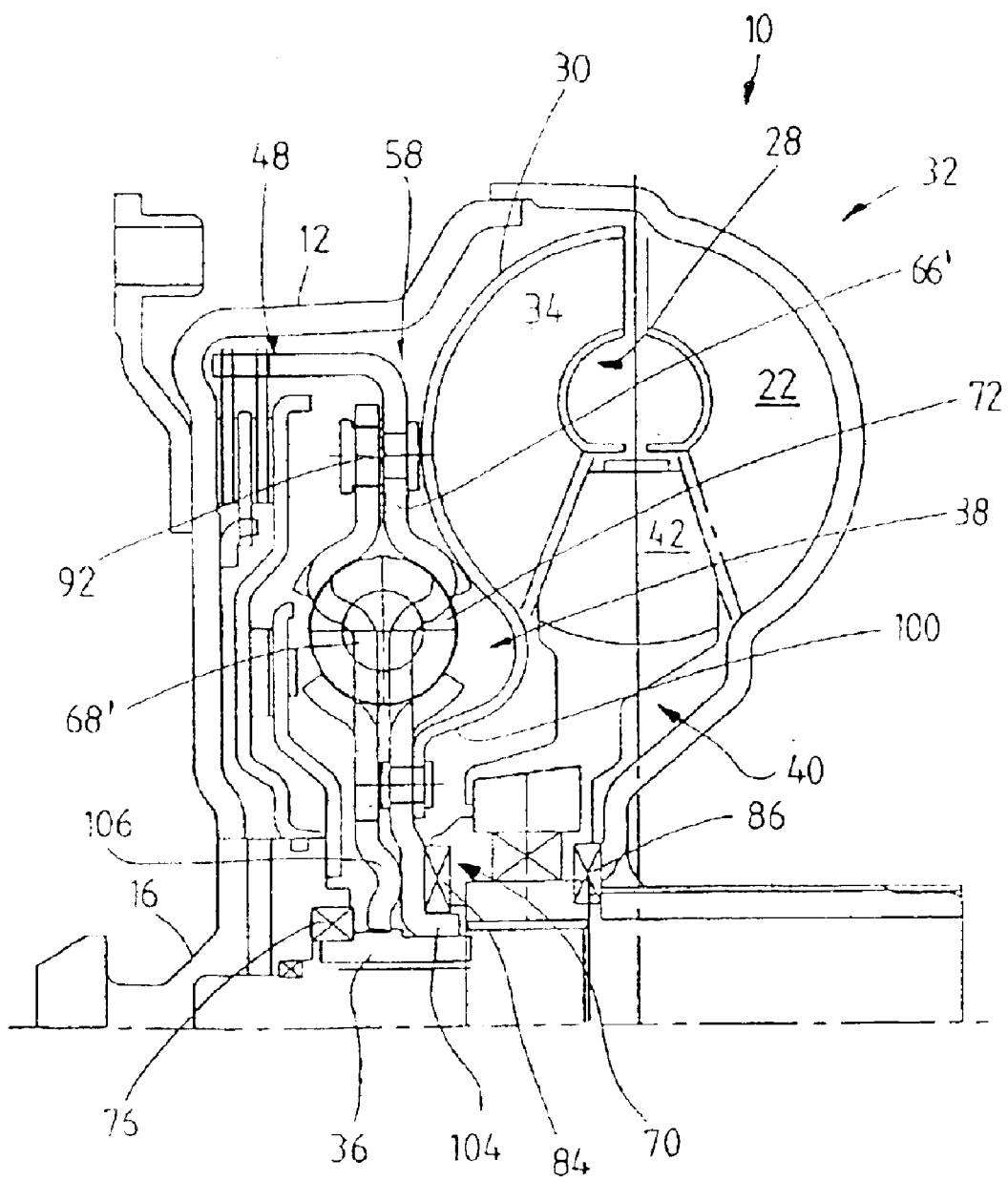
FIG. 4 shows a view in a partial longitudinal section through a hydrodynamic torque converter according to a fourth embodiment form according to the invention.

In the embodiment form shown in FIG. 4, the turbine wheel shell 30 is fixedly connected in its radial inner end area 100 to the transmission element 66' of the input side 58 of the torsional vibration damper arrangement 38, for example, by riveting in an area located radially inside the positioning means for the damper springs 72. The transmission element 66' extends further radially inward and is supported in radial direction by an axially bent, essentially cylindrical portion 104 at an outer circumferential surface of the turbine wheel hub 36. The transmission element 68' which is guided in radial direction and in axial direction in its radial outer area with respect to the transmission element 66' again by rivet bolt 92 is fastened to the turbine wheel hub 36 again in its radial inner area. Further, this transmission element 68' forms a supporting bulge area 106 in its radial inner area, the transmission element 66' being supported in axial direction at this supporting bulge area 106. The transmission element 66' is supported at its other axial side by the bearing 84 axially at the stator wheel 40 which is supported in turn at the impeller wheel 32 by the bearing 86. The turbine wheel hub 36 is axially supported at the housing hub 16 by the bearing 76.

The supporting bulge area 106 provides for a defined axial support of the transmission element 66' and, therefore, of the input side 58 of the torsional vibration damper arrangement 38 and, therefore also at the same time, of the turbine wheel shell 30 with the turbine wheel blades 34 supported at the latter.

Figure 5:
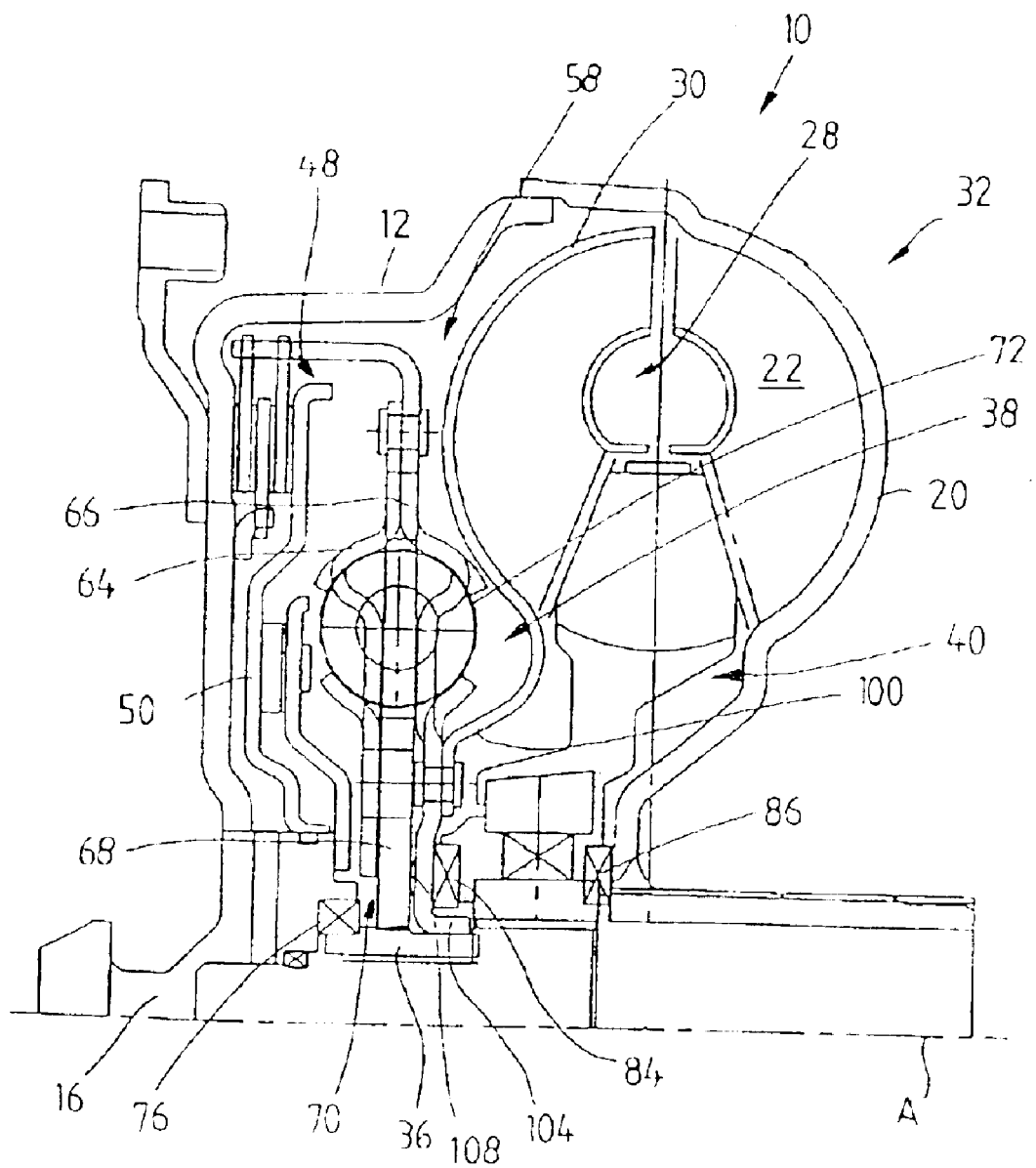
FIG. 5 shows a view in a partial longitudinal section through a hydrodynamic torque converter according to a fifth embodiment form according to the invention.

In the embodiment form shown in FIG. 5, the torsional vibration damper arrangement 38 again comprises the two cover disk elements 64, 66 acting as transmission elements to be allocated to the input side 58. The output side 70 of the torsional vibration damper arrangement 38 has the central disk element 68 acting as output-side transmission element. The cover disk element 66 located closer to the impeller wheel 32 is lengthened radially outward and is coupled to the lockup clutch arrangement 48. In its radial inner end area, this first transmission element 66 again forms the cylindrical area 104 which is supported on the outer circumferential side of the turbine wheel hub 36 in radial direction and is supported in axial direction at the stator wheel 40 by the bearing 84. A defined bearing support in the other axial direction can be obtained in that bulge areas 108 which are supported axially at the central disk element 68 are formed at the cover disk element 66. A defined bearing support of the input side 58 of the torsional vibration damper arrangement 38 is provided in radial direction and in axial direction in this way. Also, the turbine wheel shell 30 connected to the cover disk element 66 in its radial inner end area 100 is supported in this way again in axial direction and in radial direction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic torque converter comprising:
   a housing;
   a turbine wheel arranged for rotation about an axis of rotation in said housing, said turbine wheel comprising a turbine wheel shell carrying turbine wheel blades;
   a lock-up clutch for connecting the turbine wheel to the housing for transmitting torque;
   a turbine wheel hub which can be coupled with a driven member for transmitting torque; and
   a torsional vibration damper arrangement connecting the turbine wheel shell to the turbine wheel hub, the torsional vibration damper arrangement comprising a first transmission element coupled to the lock-up clutch and fixed to the turbine wheel shell at a connection, and a second transmission element connecting the first transmission element to the turbine wheel hub via a damper element arrangement, wherein the first transmission element is supported axially against a bearing situated radially inward of the connection between the first transmission element and the turbine wheel shell.

2. A hydrodynamic clutch device as in claim 1 wherein the second transmission element is supported axially by a bearing between the turbine wheel hub and the housing, the second transmission element being fixed to the turbine wheel hub.

3. A hydrodynamic clutch device as in claim 1 wherein the first transmission element is supported axially against said second transmission element axially opposite from said bearing.

4. A hydrodynamic clutch device as in claim 1 wherein the first transmission element is supported against the turbine wheel hub in a radial direction.

5. A hydrodynamic clutch device as in claim 4 wherein the first transmission element is formed with a cylindrical area which is supported radially against the turbine wheel hub.

6. A hydrodynamic clutch device as in claim 2 wherein said second transmission element is supported radially by the bearing between the turbine wheel hub and the housing.

7. A hydrodynamic clutch device as in claim 1 further comprising:
   an impeller wheel fixed to the housing; and
   a freely rotatable stator located between the first transmission element and the impeller wheel, said bearing being located axially between the first transmission element and the stator.

8. A hydrodynamic clutch device as in claim 1 wherein one of said first transmission element and said second transmission element is formed with at least one bulge which supports the first transmission element against the second transmission element, said bulge being formed axially opposite from said bearing.

9. A hydrodynamic clutch device as in claim 1 comprising a further transmission element fixed to said first transmission element at a connection radially outside of said second transmission element, the second transmission element connecting the first transmission element and the further transmission element to the turbine wheel hub via the damper element arrangement.

* * * * *